United States Patent [19]

Simms et al.

[11] Patent Number: 4,487,565

[45] Date of Patent: Dec. 11, 1984

[54] APPARATUS FOR FORMING PAINT BRUSH HEADS

[75] Inventors: Gordon R. Simms, Westfield; Philip J. Allison, Renforth; Cameron R. Benson, St. John, all of Canada

[73] Assignee: T. S. Simms & Co. Limited, Saint John, Canada

[21] Appl. No.: 377,471

[22] Filed: May 12, 1982

[51] Int. Cl.³ .................. B29C 1/00; B29D 3/00; B29D 31/00
[52] U.S. Cl. ...................... 425/115; 249/95; 425/116; 425/127; 425/371; 425/805
[58] Field of Search ........... 264/243; 425/805, 363, 425/364, 371, 116, 117, 121, 125, 127, 115; 249/83, 95

[56] References Cited

U.S. PATENT DOCUMENTS 3,077,002  2/1963  Warnken .................... 425/116
4,325,902  4/1982  Holding ..................... 264/243

FOREIGN PATENT DOCUMENTS 1255292 11/1967 Fed. Rep. of Germany ...... 425/233
2709899  9/1978 Fed. Rep. of Germany ...... 264/243
  61855  8/1955 France ......................... 425/233

*Primary Examiner*—Willard E. Hoag
*Attorney, Agent, or Firm*—Fetherstonhaugh & Co.

[57] ABSTRACT

A mold for use in molding paint brush heads comprises a pair of mold forming assemblies adapted to form a mold çavity therebetween. Each of the assemblies comprises an upper segment and a lower segment which are adapted to be retained in an end to end relationship, the lower segment having a length through which a bristle knot can be inserted with ease. A molding machine for use in molding ferruleless paint brush heads is also disclosed in which there is provided the improvement of a mold assembly comprising a first pair of molding belts, each having oppositely disposed forward run portions extending continuously through a bristle loading station and then through at least one molding station. The forward run portions of the first molding belts have dividers extending therebetween which form plurality of mold cavities proportioned to receive the proximal end of a bristle knot therebetween. A second pair of molding belts each having a forward run portion are also provided. The forward run portions of the second pair of molding belts being disposed opposite one another and extending through said molding station in an edge to edge relationship, one with each first molding belt to extend the molding cavity to the full height of the required brush head.

3 Claims, 10 Drawing Figures

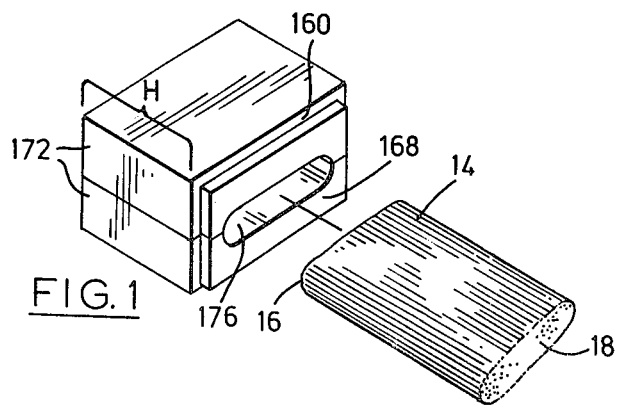
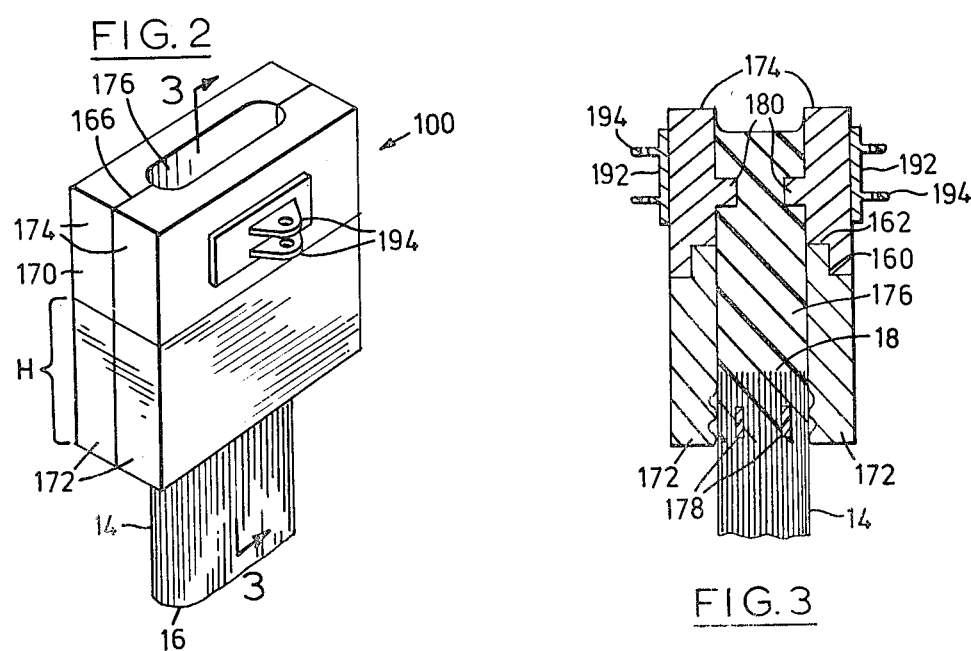

APPARATUS FOR FORMING PAINT BRUSH HEADS

This invention relates to apparatus for manufacturing a paint brush. In particular, this invention relates to apparatus for manufacturing a ferruleless paint brush in which the head is detachable from the handle.

PRIOR ART

We have co-operated with Morley L. Smith in the development of a ferruleless paint brush, an application for patent for which is about to be filed in the United States Patent Office and is to be assigned to the assignee in the present application.

We have developed an improved apparatus for manufacturing a ferruleless paint brush which is constructed in accordance with a structure proposed in the Smith application.

Our apparatus permits the manufacture of ferruleless paint brush heads suitable for quick release clamping to a paint brush handle.

It is an object of the present invention to provide a simple and efficient apparatus for forming a head of a paint brush in which the bristles are embedded in the body of plastic, and in which the head is adapted to be connectable to a paint brush handle.

SUMMARY OF INVENTION

According to one aspect of the present invention, there is provided a mold for use in molding paint brush heads comprising a pair of mold forming assemblies disposed opposite one another and adapted to form a mold cavity therebetween, the cavity having an open upper end and an open lower end, each of said assemblies comprising an upper segment and a lower segment which are adapted to be retained in an end to end relationship, the lower segment having a length through which a bristle knot can be inserted with ease.

According to a further aspect of the present invention, there is provided in the molding machine for use in molding ferruleless paint brush heads the improvement of a mold assembly comprising a first pair of molding belts, each having a forward run portion, the forward run portions being disposed opposite one another and extending continuously through a bristle loading station and then through at least one molding station. The forward run portions of the first ferruleless molding belts have dividers extending therebetween which form plurality of mold cavities, the forward run portions being proportioned to receive the proximal end of a bristle knot therebetween. A second pair of molding belts each having a forward run portion are also provided. The forward run portions of the second pair of molding belts being disposed opposite one another and extending through said molding station in an edge to edge relationship, one with each first molding belt to extend the molding cavity to the full height of the required brush head.

The invention will be more clearly understood with reference to the following detailed description provided in conjunction with the drawings wherein:

FIG. 1 is a pictorial side view of the lower segment of a mold positioned to receive a bristle knot in accordance with a first embodiment of the present invention;

FIG. 2 is a pictorial view of a mold assembly arranged for molding; and

FIG. 3 is a sectional view along the line 3—3 of FIG. 2;

Figure 4:
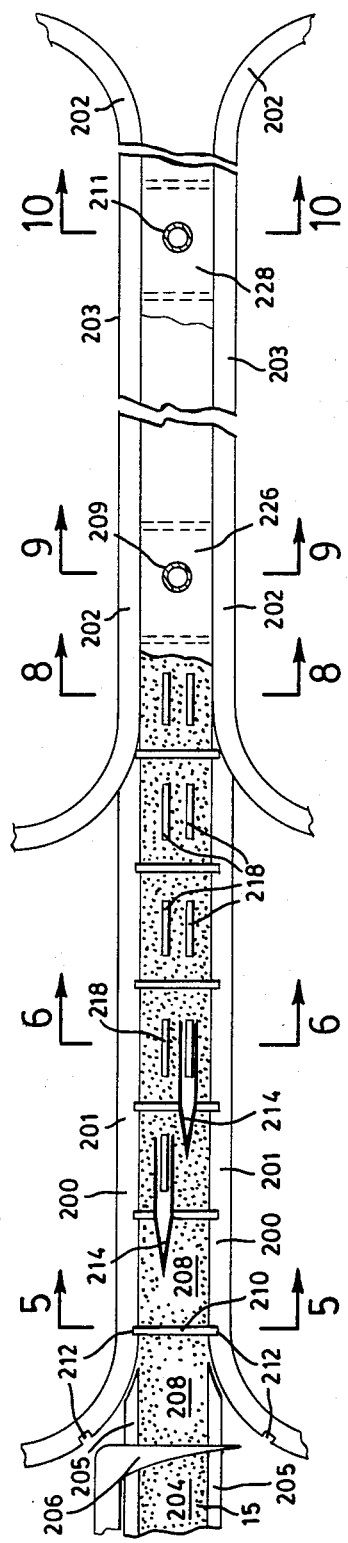
FIG. 4 is a diagrammatic plan view of a molding assembly for use in molding a head on a bristle knot in accordance with a further embodiment of the present invention.
Figure 10:
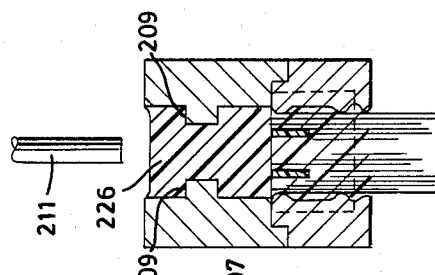
FIG. 10 is a sectional view taken along the line 10—10 of FIG. 4.

With reference to FIG. 2 of the drawings, reference numeral 100 refers generally to a mold for use in molding paint brush heads constructed in accordance with an embodiment of the present invention. The mold 100 consists of a pair of lower mold segments 172 and a pair of upper mold segments 174 which co-operate with one another to define a mold cavity 176. As shown in FIG. 3 the upper edge 160 of the lower mold segments and the lower edge 162 of the upper mold segments are shaped to interlock to retain the upper and lower segments in an edge to edge relationship forming a common cavity 176 therebetween. The upper mold segments 174 are each formed with protrusions 180 which project into the cavity 176 and serve to form mounting channels along opposite side faces of the cast head portion 182.

The lower segments 172 have a height H through which a bristle knot 14 can be inserted with ease.

As shown in FIG. 1 of the drawings, the first step in positioning the bristle knot is to assemble the bristle knot 14 and to insert the distal end 16 thereof into the open upper end of the lower mold segments 72. The bristle knot 14 is subsequently patted so that the proximal end 18 thereof is located proximate the input end 168 of the lower cavity portion 176 formed between the lower segment 172. Plugs 178 are then inserted into the proximal end 18 of the knot 14 and the knot is then tapped home so that the distal end 18 of the bristles is located at the level shown in broken lines in FIG. 3. The upper load segments 174 are then positioned in an end to end sealed relationship with respect to the lower mold segments 172 as shown in FIGS. 2 and 3.

A predetermined quantity of plastic resin is then dispensed into the mold cavity 176. The plastic resin penetrates the proximal end of the knot 14 so that the proximal ends of the bristles and the stiffener plugs 178 are embedded in the body of plastic material. After the resin has set the mold segments 172 and 174 are opened along the split line 166 to expose the molded head formed at the proximal end of the bristle knot 14.

Brackets 192 are mounted on the outer face of each of the upper mold segments 174. The brackets 192 have lugs 194 adapted to be mounted on the links of a support chain (not shown) so that the molds may be mounted for our continuous movement through a molding machine.

The bristle knots 14 are tapered from a maximum thickness at their proximal end to a minimum thickness at their distal end and consequently to facilitate loading of the bristle knot 14 it is important that the knot be loaded distal end first into the cavity 176 as shown in FIG. 1 of the drawings. For this reason it is desirable to minimize the height of the mold cavity through which the bristle must be inserted and we have achieved this by dividing the mold into upper and lower segments. In addition the divided mold permits the formation of protrusions in the upper segment while allowing the knot to pass through lower mold from the upper end thereof.

A further embodiment of the present invention is illustrated in FIGS. 4 to 10 inclusive. In this embodiment a first pair of molding belts 200 and a second pair of molding belts 202 are provided. The first pair of molding belts 200 each have a forward run portion 201 which extends through a loading station A and a molding station B. The second pair of molding belts 202 each have a forward run portion 203 which extends through the molding station B.

The first pair of molding belts 200 each have an upper edge 205 (FIG. 5) which is stepped and the second pair of molding belts 202 each have a lower edge 203 (FIG. 8) which has corresponding complementary step configuration. The first pair of molding belts 202 are formed with notches 212 at spaced intervals along the lengths thereof.

A plurality of bristles 15 are assembled in an array of bristles in a parallel side by side relationship and are supported by a third set of conveyors 205. A divider 206 is mounted to reciprocate to and fro into the accumulated array of bristles 204 to divide the array 204 into individual knot 208. A spacer member 210 is positioned in the space formed by the divider 202 between adjacent knots in alignment with the notches 212 formed in the belts such that opposite ends of the dividers 210 are supported in and carried by the belts 202. The divider 206 is mounted so as to reciprocate into and out of the path of travel of the array of bristles 204 so as to provide knots 208 of the required width.

Figure 8:
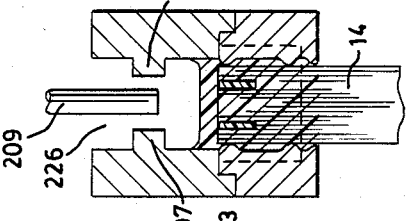
FIG. 8 is a sectional view taken along the line 8—8 of FIG. 4.
Figure 7:
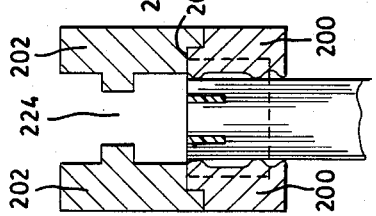
FIG. 7 is a side view of a section of the assembly of FIG. 4 showing the bristle knot being lowered to the level of the upper edge of the first molding belts.
Figure 6:
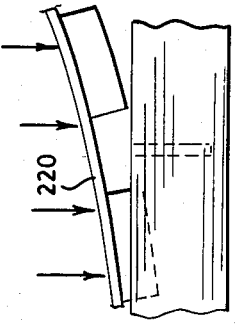
FIG. 6 is a sectional view taken along the line 6—6 of FIG. 4.
Figure 5:
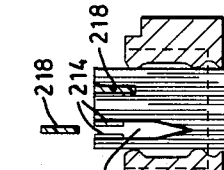
FIG. 5 is a sectional view taken along the line 5—5 of FIG. 4.

Plow blades 214 form a trough 216 (FIG. 6) in the proximal end of each bristle knot 208 and a plug 218 is located in each trough 216 to form a stiffener at the proximal end of the bristle knot. In order to position the proximal end of the bristle knot 208 entirely within the cavity formed in the lower mold 200 the bristles are tapped downwardly by means of a pusher element 220 as shown in FIG. 7. The pusher element 220 is effective to locate the bristle knot in the position shown in FIG. 8 of the drawings wherein the proximal end of the knot extends at the level of the upper edge of the first molding belts 200. After tapping of the bristle knot to the required level with respect to the belts 200, the assembly passes to the molding station wherein the second molding belts 202 are located in an edge to edge relationship with respect to the first belts 200 as shown in FIG. 8. The second molding belts 202 are each formed with a projection 207 which extends longitudinally thereof and which projects into the molding cavity 224 formed between the belts. The projections 207 serve to form channel shaped recesses 209 in the molded head portion 226.

Figure 9:
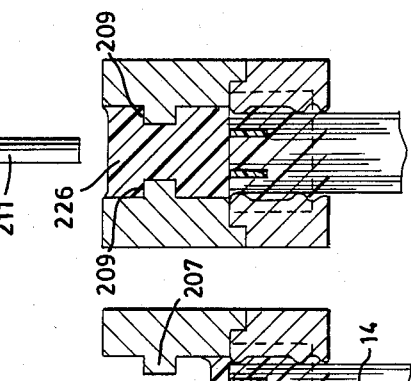
FIG. 9 is a sectional view taken along the line 9—9 of FIG. 4.

After the molding belts 200 and the molding belts 202 have been positioned as shown in FIG. 8, a first quantity of resin is discharged into the molding cavity 206 through a dispenser tube 209. The resin which is introduced in the first pour is sufficient in quantity to embed the proximal ends of the bristles therein as shown in FIG. 9. The second pour of resin is effected by a second dispenser tube 211 to fill the remainder of the cavity and thereby form the complete head 226.

By employing a fast setting resin it is possible to separate the belts 200 and 202 and discharge the molded head directly therefrom. The molded head with the channels 209 formed therein is suitable for use in association with a quick release handle to form a paint brush.

A resin from which the rigid molded plastic head may be made is preferably a high speed curing resin such as a solvent free, two component polyurethane adhesive such as that sold by Henkko Corporation and identified by the trade mark MACROPLAST, in which the resin is identified as macroplast resin U.K. 8201 and the hardener is identified as macroplast hardener U.K. 5400.

From the foregoing, it can be apparent that the present invention provides a simple and efficient method and apparatus for use in manufacturing paint brush heads in which the bristles are embedded in a body of plastic material.

Various modifications of the present invention will be apparent to those skilled in the art. For example, the shape of the protrusions formed in the upper mold which extend into the cavity to form the handle mounting recesses may be modified to accommodate any form of clamping configuration which may be required by the handle.

We claim:
1. A mold for use in molding a paint brush head which is suitable for subsequent attachment to a handle and which includes a bristle knot of a predetermined length comprising;
   (a) a pair of mold forming assemblies disposed opposite one another and adapted to form a longitudinally elongated mold cavity therebetween, the mold cavity having an open upper end through which plastic material is admitted to the mold cavity in use and an open lower end through which a bristle knot projects in use,
   (b) each of said assemblies being transversly subdivided along a part-line which extends transversly thereof along butting end faces and divides the mold cavity into upper and lower chambers which extend away from opposite sides of the part-line, said part-line also dividing the mold assemblies at the butting end faces to form an upper segment and a lower segment which are adapted to be retained in an end to end relationship, detent means on each segment projecting inwardly of the upper chamber and extending transversly of the longitudinal extent of the upper chamber to form recesses in the molded head of the paint brush, the lower segment having a length which is less than said predetermined length of said bristle knot such the bristle knot can be inserted into the lower chamber from one end to project through the other end thereof, and
   (c) mounting means on each upper segment for use in mounting said segments on a conveyor for movement through a molding machine with the longitudinal extent of the mold cavity extending perpendicular to the direction of movement of the conveyor in use.

2. In the molding machine for use in molding ferruleless paint brush heads the improvement of a mold assembly comprising;
   (a) a first pair of molding belts each having a forward run portion, said forward run portions being disposed opposite one another and extending through a bristle loading station and then through at least one molding station, said forward run portions having divider means extending therebetween which form a plurality of mold cavities, (b) a second pair of molding belts each having a forward run portion, said forward run portion of said second pair of molding belts being disposed opposite one another and extending through said molding station in an edge to edge relationship one with each of said first molding belts to extend the molding cavity to the full height of the required brush head.

3. A mold for use in molding paint brush heads comprising:

(a) a pair of mold forming assemblies disposed opposite one another and adapted to form a mold cavity therebetween, the mold cavity having an open upper end and an open lower end, (b) each of said assemblies comprising an upper segment and a lower segment which are adapted to be retained in an end to end relationship, the lower segment having a length through which a bristle knot can be inserted with ease, (c) each lower segment is in the form of a continuous first belt having a forward run portion, the forward run portion of each first belt being disposed opposite the forward run portion of the other belt, (d) divider means located between opposite faces of each forward run of said first belt at spaced intervals along the length thereof to form said mold cavities, and wherein;

(e) each lower segment is in the form of a continuous second belt having a forward run portion, the forward run portions of each second belt being disposed opposite one another, the forward run portion of each second belt being disposed above the forward run portions of the first belts in an edge to edge relationship.

* * * * *